United States Patent
Kong et al.

(10) Patent No.: US 6,952,443 B1
(45) Date of Patent: Oct. 4, 2005

(54) METHOD AND APPARATUS FOR DETERMINING RATE OF DATA TRANSMITTED AT VARIABLE RATES

(75) Inventors: Jun-jin Kong, Sungnam (KR); Min-goo Kim, Suwon (KR); Hyun-woo Park, Suwon (KR); Byung-ho Min, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/386,965

(22) Filed: Aug. 31, 1999

(30) Foreign Application Priority Data

Aug. 31, 1998 (KR) .................................. 98-35712

(51) Int. Cl.$^7$ .......................... H04B 17/00; H04B 3/46; H04Q 1/20
(52) U.S. Cl. ...................................... 375/225; 375/340
(58) Field of Search ............................... 375/225, 262, 375/265, 341, 340; 714/795; 370/252

(56) References Cited

U.S. PATENT DOCUMENTS

| | | | | |
|---|---|---|---|---|
| 5,453,997 | A | 9/1995 | Roney, IV | 371/41 |
| 5,566,206 | A * | 10/1996 | Butler et al. | 375/225 |
| 6,088,325 | A * | 7/2000 | Giardina et al. | 370/207 |
| 6,377,606 | B1 * | 4/2002 | Toskala et al. | 375/130 |
| 6,388,615 | B1 * | 5/2002 | Chang et al. | 342/368 |
| 6,424,631 | B1 * | 7/2002 | Czaja et al. | 370/252 |
| 6,560,448 | B1 * | 5/2003 | Baldwin et al. | 455/234.1 |
| 6,678,315 | B1 * | 1/2004 | Hikita et al. | 375/222 |

FOREIGN PATENT DOCUMENTS

| | | | |
|---|---|---|---|
| EP | 0 711 056 A2 | 5/1996 | .......... H04L 23/02 |
| JP | 5-244019 | 9/1993 | |
| JP | 6-232768 | 8/1994 | |
| JP | 7-38620 | 2/1995 | |
| JP | 8-88569 | 4/1996 | |
| JP | 8-130535 | 5/1996 | |
| JP | 8-139695 | 5/1996 | |
| JP | 9-501548 | 2/1997 | |
| JP | 9-74404 | 3/1997 | |
| JP | 10-507333 | 7/1998 | |
| KP | 1998-12952 | 2/1999 | |
| WO | 95/01032 | 1/1995 | .......... H04L 25/02 |
| WO | 97/05717 | 2/1997 | .......... H04B 17/00 |
| WO | WO 97/363378 | * 10/1997 | |
| WO | 99/38265 | 7/1999 | .......... H03M 13/00 |

* cited by examiner

Primary Examiner—Phuong Phu
(74) Attorney, Agent, or Firm—Sughrue Mion, PLLC

(57) ABSTRACT

A method and apparatus for determining the rate of data transmitted at variable rates. In the method and apparatus, received data is pre-decoded at receivable rates by pre-decoders which adopt a simple structure and perform pre-decoding rapidly, quality information of the pre-decoded data is detected, and the rate of the received data is estimated based on the quality information of the pre-decoded data. Therefore, the decoding speed of the received data and the decision speed of the data rate increase, reducing power consumption.

38 Claims, 2 Drawing Sheets

METHOD AND APPARATUS FOR DETERMINING RATE OF DATA TRANSMITTED AT VARIABLE RATES

BACKGROUND OF THE INVENTION

1. Field of the Invention

The present invention relates to digital communications, and more particularly to a method and apparatus for determining rate of data transmitted at a variable rate in a variable-rate communications system.

2. Description of the Related Art

In variable-rate communications systems such as a variable-rate voice coder, the data rate of transmitted data should be determined in order to receive and process the transmitted variable-rate data without an indication of the data rate. U.S. Pat. No. 5,566,206, entitled "Method And Apparatus For Determining Data Rate of Transmitted Variable Rate Data in a Communications Receiver", will now be briefly described with reference to FIG. 1.

In a conventional apparatus for determining data rate shown in FIG. 1, a first Viterbi decoder 101 performs Viterbi decoding on received data under the assumption that the data is received at a full rate, a first encoder 102 re-encodes the output from the first Viterbi decoder 101, a first comparator (COMP) 103 compares the received data 123 to the data 128 which is obtained by re-encoding the output 124 from the Viterbi decoder 101 in the first encoder 102, and a first counter 104 outputs the number of errors 129 according to the output from the first COMP 103.

A first summer 105, a second Viterbi decoder 106, a second encoder 107, a second COMP 108 and a second counter 109 perform the same operations as above at a half rate. A second summer 110, a third Viterbi decoder 111, a third encoder 112, a third COMP 113 and a third counter 114 operate as above at a ¼ rate. A third summer 115, a fourth Viterbi decoder 116, a fourth encoder 117, a fourth COMP 118 and a fourth counter 119 operate as above at a ⅛ rate. A microprocessor 122 determines the rate of the received data using error metrics 129, 132, 136 and 140 from the first, second, third and fourth counters 104, 109, 114 and 119, CRC results 125 and 127 from first and second cyclic redundancy code circuits (CRCs) 120 and 121, and Yamamoto Quality Metrics 141 and 142 from the third and fourth Viterbi decoders 111 and 116.

The conventional rate determination apparatus shown in FIG. 1 adopts a post-data rate determination method using Viterbi decoders which have a complicated structure and require much time to decode data. That is, after performing Viterbi decoding at each receivable data rate, the rate of the received data is determined using symbol error rates which indicate the quality of respective decoded data. Thus, power consumption increases due to the complicated structures and processing speed of the Viterbi decoders, in addition to a temporal loss.

In another data rate determination apparatus disclosed in U.S. Pat. No. 5,627,845, entitled "Variable Rate Communication Method and a Variable Rate Communication System," the rate of received data is estimated using repetition characteristics of the received data. Also, in U.S. Pat. No. 5,689,511, entitled "Data Receiver For Receiving Code Signals Having a Variable Data Rate," the number of repetitions is determined by calculating an auto-correlation function of a received data frame, and the rate of the received data is then estimated.

SUMMARY OF THE INVENTION

It is an object of the present invention to provide a pre-data rate determination method in which pre-decoding is performed at each receivable data rate and the rate of received data is determined using quality information (symbol error rate) of the pre-decoded data.

It is another object of the present invention to provide a data rate determination apparatus in a variable-rate communications system, which determines the rate of received data using pre-decoders adopting a simple structure and a rapid decoding speed, in a case where information about the data rate is not known upon receiving of the data.

To achieve the first object, there is provided a method for determining the rate of received data in a variable-rate communications system, the method comprising the steps of: (a) pre-decoding the received data at receivable data rates and detecting quality information of the data pre-decoded at the respective data rates; and (b) estimating the rate of the received data based on the quality information of the data pre-decoded at the respective data rates.

To achieve the second object, there is provided an apparatus for determining the rate of received data in a variable-rate communications system, the apparatus comprising: a first means for pre-decoding the received data at receivable data rates and providing quality information of the data pre-decoded at the respective data rates; and a second means for estimating the rate of the received data based on the quality information of the data pre-decoded at the respective data rates.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 2:
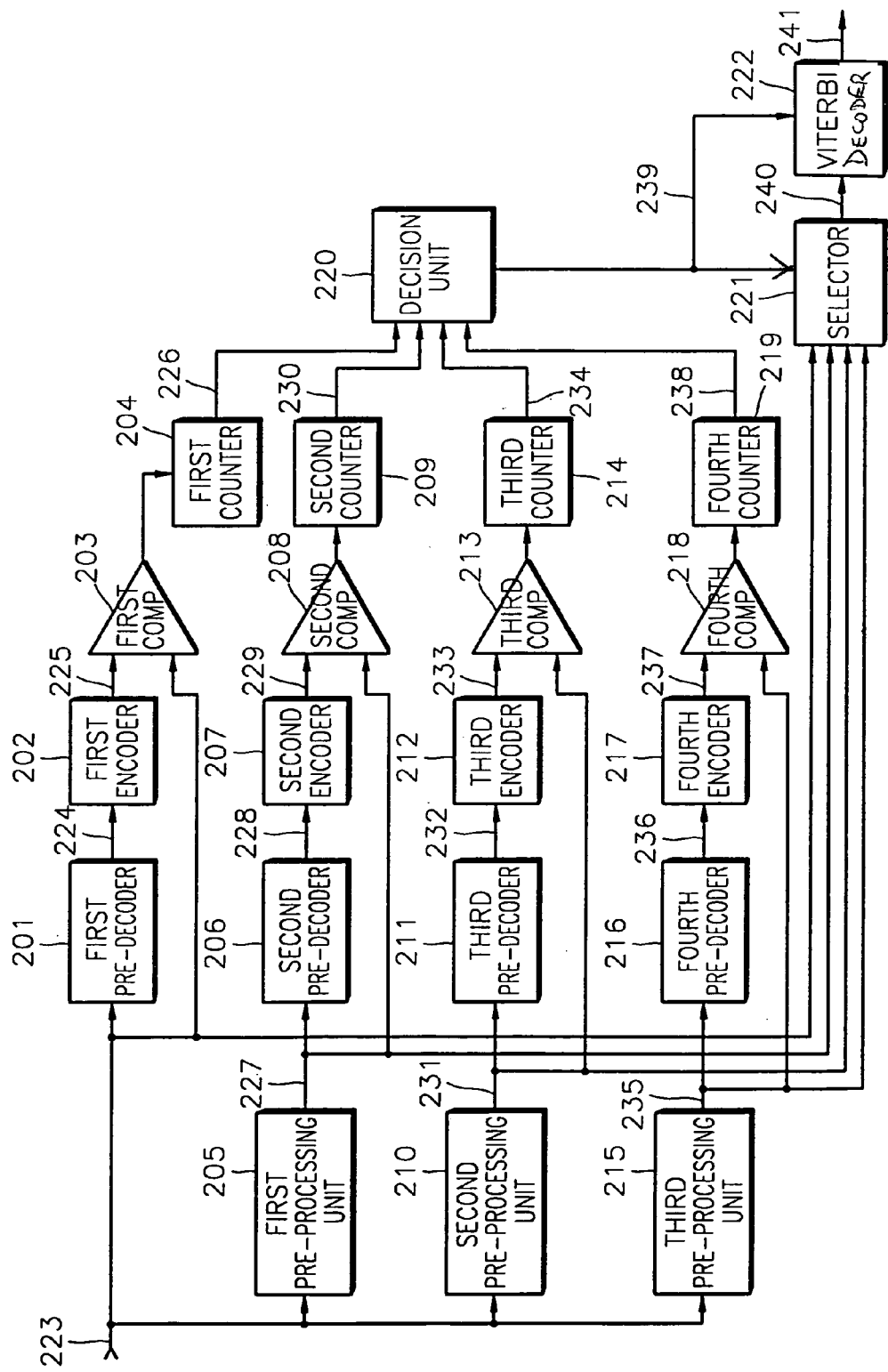
FIG. 2 is a block diagram of a data rate determination apparatus according to a preferred embodiment of the present invention.

Referring to FIG. 2, in a data rate determination apparatus according to a preferred embodiment of the present invention, as in an IS (Interim Standard)-95 system, the data rate of a transmitted and received data is assumed to be one of four rates; full rate, half rate, ¼ rate and ⅛ rate.

The data rate determination apparatus according to the present invention comprises a first pre-decoder 201, a first encoder 202, a first comparator (COMP) 203 and a first counter 204, which are for pre-decoding received data 223 by assuming the received data rate to be a first data rate, for example, the full rate, and obtaining quality information of the decoded data; a first pre-processing unit 205, a second pre-decoder 206, a second encoder 207, a second COMP 208 and a second counter 209, which are for pre-decoding the received data 223 by assuming the received data rate to be a second data rate, for example, the half rate, and obtaining quality information of the decoded data; a second pre-processing unit 210, a third pre-decoder 211, a third encoder 212, a third COMP 213 and a third counter 214, which are for pre-decoding the received data 223 by assuming the received data rate to be a third data rate, for example, the ¼ rate, and obtaining quality information of the decoded data; a third pre-processing unit 215, a fourth pre-decoder 216, a fourth encoder 217, a fourth COMP 218 and a fourth counter 219, which are for pre-decoding the received data 223 by assuming the received data rate to be a fourth data rate, for example, the ⅛ rate, and obtaining quality information of the decoded data; a decision unit 220 for deciding the rate of the received data using quality information 226, 230, 234 and 238; a selector 221 for selecting one of data 223, 227, 231 and 235 pre-processed at receivable data rates, using information 239 corresponding to the data rate determined by the decision unit 220; and a Viterbi decoder 222 for Viterbi-decoding data 240 corresponding to the selected data rate. The first through fourth pre-decoders 201, 206, 211 and 216, the first through fourth encoders 202, 207, 212 and 217, the first through fourth comparators 203, 208, 213 and 218, and the first through fourth counters 204, 209, 214 and 219 can be collectively referred to as a first means for pre-decoding the received data at receivable data rates and providing quality information of the data pre-decoded at respective data rates and the decision unit 220 can be referred to as a second means for estimating the rate of the received data based on the quality information of the data pre-decoded at the respective data rates.

In the operation of the data rate determination apparatus shown in FIG. 2, the received data 223 which is demodulated symbol data, is provided to the first pre-decoder 201 and the first through third pre-processing units 205, 210 and 215. The first through third pre-processing units 205, 210 and 215 may be constructed of a summer or a combiner in the case where the data is repeatedly transmitted according to respective data rates, or of a selector in the case where only a selected part of every symbol is transmitted according to the data rate.

That is, the first pre-processing unit 205 sums the received data 223 every two-symbol unit or extracts half of the symbol, and outputs the data 227 pre-processed at a half rate. The second pre-processing unit 210 sums the received data 223 every four-symbol unit or extracts one fourth of the symbol, and outputs the data 231 pre-processed at a ¼ rate. The third pre-processing unit 215 sums the received data 223 every eight-symbol unit or extracts one eighth of the symbol, and outputs the data 235 pre-processed at a ⅛ rate.

The first through fourth pre-decoders 201, 206, 211 and 216, which constitute the features of the present invention, are a kind of convolution encoder which utilizes the inverse function of a generating function of a convolution encoder in a transmitter, as a generating function.

Assuming that the information sequence to be transmitted is I(x), the generating function is G(x) and a code sequence encoded by a convolution encoder is C(x), the following mathematical formula (1) is formed.

$$C(x)=I(x) \cdot G(x) \quad (1)$$

The transmitter transmits C(x), and a receiver receives C(x) in addition to noise incorporated into C(x). Assuming that the received data is R(x) and error generated due to noise is E(x), the received data R(x) can be expressed by the mathematical formula (2).

$$R(x)=C(x)+E(x) \quad (2)$$

When the first through fourth pre-decoders 201, 206, 211 and 216 are constructed as a convolution encoder which utilizes the inverse function of G(x) as a generating function, and the received data R(x) is decoded by the pre-decoders 201, 206, 211 and 216, the following mathematical formula (3) is formed.

$$R(x) \cdot G^{-1} = [C(x) + E(x)] \cdot G^{-1}(x) \quad (3)$$
$$= C(x) \cdot G^{-1}(x) + E(x) \cdot G^{-1}(x)$$
$$= I(x) + E(x) \cdot G^{-1}(x)$$

wherein $C(x) \cdot G^{-1}(x) = I(x)$.

In the formula (3), if there is no error present in the received data, which means E(x)=0, the following mathematical formula (4) is formed.

$$R(x) \cdot G^{-1}(x) = I(x) + E(x) \cdot G^{-1}(x) \quad (4)$$
$$= I(x)$$

Therefore, it can be understood that the decoding can be completed by the pre-decoders. That is, the first pre-decoder 201 decodes the received data 223, and the first encoder 202 re-encodes the decoded data from the first pre-decoder 201. The first comparator 203 compares the received data 223 to data 225 which is obtained by re-encoding the output 224 from the first pre-decoder 201 in the first encoder 202, and the first counter 204 counts the number or errors according to the comparison result of the first comparator 203 and outputs a symbol error rate (which can be referred to as an error metric or quality information) 226 with respect to the first data rate to the decision unit 220. The re-encoded data 225, 229, 233 and 237 from the first through fourth encoders 202, 207, 212 and 217 can be viewed as first through fourth quality indicator.

The second pre-decoder 206 decodes the data 227 pre-processed at a half rate and the second encoder 207 re-encodes the decoded data from the second pre-decoder 206. The second comparator 208 compares the data 227 pre-processed at a half rate to the data 229 which is obtained by re-encoding the output 228 from the second pre-decoder 206 in the second encoder 207, and the second counter 209 counts the number of errors according to the comparison result of the second comparator 208 and outputs a symbol error rate 230 with respect to the second data rate to the decision unit 220.

The third pre-decoder 211 decodes the data 231 pre-processed at a ¼ rate and the third encoder 212 re-encodes the decoded data from the third pre-decoder 211. The third comparator 213 compares the data 231 pre-processed at a ¼ rate to the data 233 which is obtained by re-encoding the output 232 from the third pre-decoder 211 in the third encoder 212, and the third counter 214 counts the number of errors according to the comparison result of the third comparator 213 and outputs a symbol error rate 234 with respect to the third data rate to the decision unit 220.

The fourth pre-decoder 216 decodes the data 235 pre-processed at a ⅛ rate and the fourth encoder 217 re-encodes the decoded data from the fourth pre-decoder 216. The fourth comparator 218 compares the data 235 pre-processed at a ⅛ rate to the data 237 which is obtained by re-encoding the output 236 from the fourth pre-decoder 216 in the fourth encoder 217, and the fourth counter 219 counts the number of errors according to the comparison result of the fourth comparator 218 and outputs a symbol error rate 238 with respect to the fourth data rate to the decision unit 220.

The decision unit 220 decides the data rate having the least symbol error rate among the symbol error rates 226, 230, 234 and 238, as a data rate of the received data, and provides selection information 239 with respect to the determined data rate to the selector 221 and the Viterbi decoder 222 in sequence. The selector 221 selects one of the data 223, 227, 231 and 235 pre-processed at receivable data rates such as a full, half, ¼ and ⅛ rates, according to the selection information 239 from the decision unit 220. The Viterbi decoder 222 performs Viterbi decoding only on data 240 which corresponds to the data rate selected by the selector 221, using the selection information 239, and outputs decoded data 241.

In the data rate determination method and apparatus therefor according to the present invention, received data is pre-decoded at assumed receivable data rates. However, the received data may incorporate considerable errors because the assumed data rates can be different from the actual data rate. Thus, symbol error rates are calculated using the outputs from the pre-decoders to obtain the quality information of the data decoded at different data rates, and the rate of the received data can be determined using the symbol error rates.

Also, even when errors are present in the received data, the symbol error rates of the data decoded by the pre-decoders differ according to the assumed receivable data rates, so that the rate of the received data can be determined using the symbol error rates.

Figure 1:
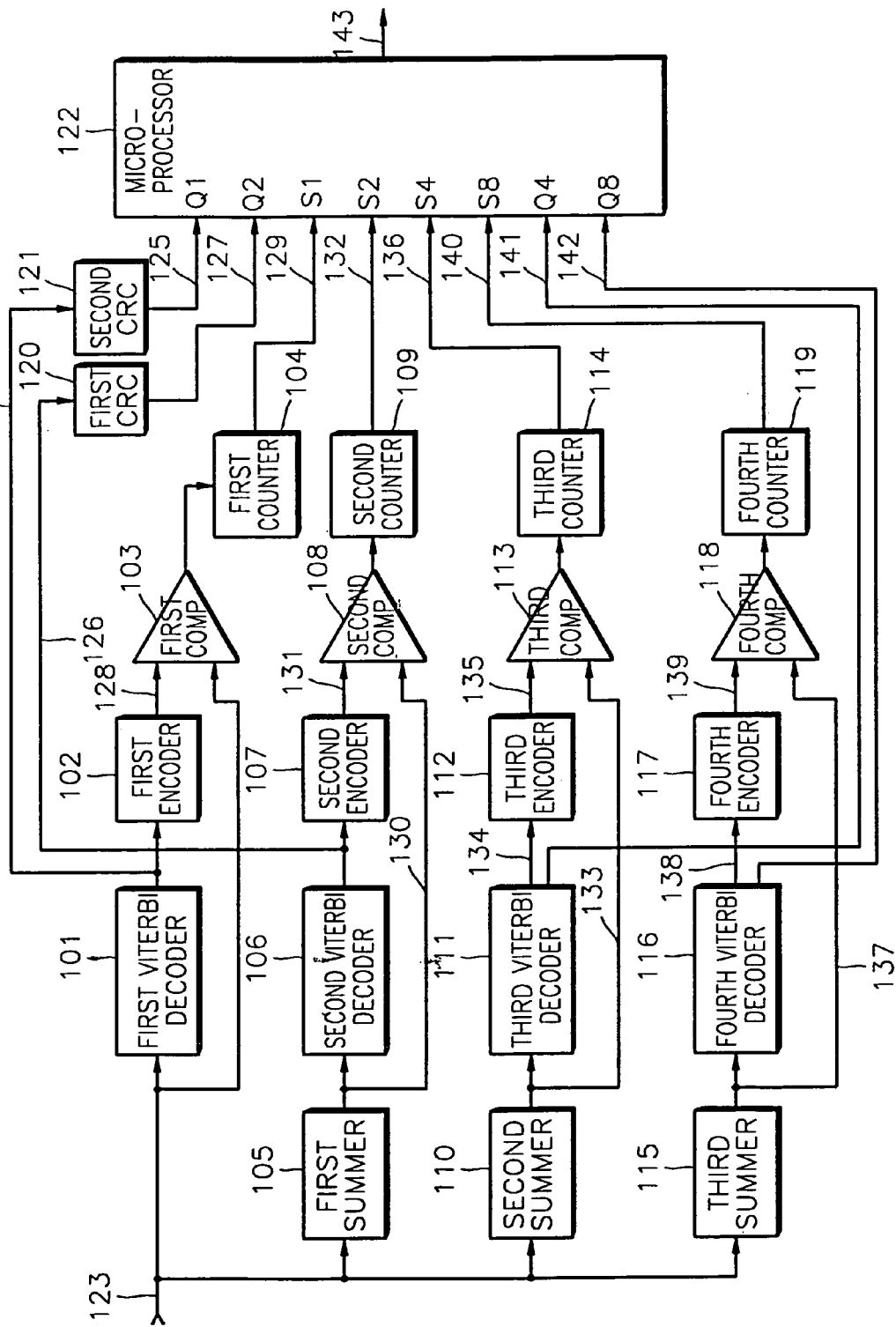
FIG. 1 is a block diagram of a conventional data rate determination apparatus.

In the above embodiment, the symbol error rates of the data decoded by the pre-decoders are used as quality information. In addition, the CRC results, as mentioned with reference to FIG. 1, can be used. The present invention can be applied to any apparatus which determines a variable rate of received data using quality information obtained from data decoded by pre-decoders.

The method and apparatus for determining the rate of data transmitted at a variable data rate according to the present invention can be applied to determine the rate of the received data in a receiver of a variable-rate communications system such as an IS-95 CDMA (Code Division Multiple Access) system and an IMT (International Mobile Telecommunications)-2000 system.

As described above, in the present invention, the rate of the received data can be estimated using pre-decoders which have a simple structure and a rapid decoding speed, compared to the Viterbi decoders. Then, Viterbi decoding is performed only on data which corresponds to the estimated data rate, so that the decoding speed of the received data and the decision speed of the data rate increase, thereby lowering power consumption.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for determining the rate of received data in a variable-rate communications system, the method comprising the steps of:
   (a) pre-decoding data received at variable data rates and detecting quality information of the pre-decoded data received at the respective data rates, wherein the quality information is a symbol error rate; and
   (b) estimating the rate of the received data based on the quality information of the pre-decoded data at the respective data rates, wherein the pre-decoding step is performed without using Viterbi decoding.

2. The method of claim 1, wherein the pre-decoding in step (a) is performed using an inverse function of a generating function used for encoding.

3. The method of claim 1, further comprising the step of:
   (c) Viterbi decoding only the data corresponding to the estimated data rate.

4. A method for determining the rate of data received by a receiver in a variable-rate communications system, the method comprising the steps of:
   (a) pre-decoding the received data at a first data rate and re-encoding the result, to output a first quality indication;
   (b) comparing the received data with the first quality indication, and counting the number of errors resulting from the comparison, to output an error metric for the first data rate;
   (c) pre-decoding the received data at a second data rate and re-encoding the result, to output a second quality indication;
   (d) comparing the received data with the second quality indication, and counting the number of errors resulting from the comparison, to output an error metric for the second data rate; and
   (e) estimating the rate of the received data using the error metrics determined for the first and second data rates;
   wherein the pre-decoding steps are performed without using Viterbi decoding.

5. The method of claim 4, further comprising the step of:
   (f) selecting the estimated data rate from step (e) and Viterbi decoding only the selected data.

6. The method of claim 4, wherein the pre-decoding in steps (a) and (c) is performed using an inverse function of a generating function for encoding.

7. The method of claim 4, further comprising the steps of:
   (f) pre-decoding the received data at a third data rate and re-encoding the result, to output a third quality indication; and
   (g) comparing the received data with the third quality indication, and counting the number of errors resulting from the comparison, to output an error metric for the third data rate, wherein the error metric for the third data rate is also compared in the estimation of the data rate in the step (e).

8. The method of claim 7, further comprising the steps of:
   (h) pre-decoding the received data at a fourth data rate and re-encoding the result, to output a fourth quality indication; and
   (g) comparing the received data with the fourth quality indication, and counting the number of errors resulting from the comparison, to output an error metric for the fourth data rate, wherein the error metric for the fourth data rate is also compared in the estimation of the data rate in the step (e).

9. An apparatus for determining the rate of received data in a variablerate communications system, the apparatus comprising:
   a first means for pre-decoding data received at variable data rates, without using Viterbi decoding, and providing quality information concerning the pre-decoded data received at the respective data rates, wherein the quality information is a symbol error rate; and
   a second means for estimating the rate of the received data, based on the quality information of the pre-decoded data received at the respective data rates.

10. The apparatus of claim 9, further comprising a Viterbi decoder for Viterbi decoding only the data corresponding to the estimated data rate.

11. An apparatus for determining the rate of data received by a receiver in a variable-rate communications system, the apparatus comprising:
 a first pre-decoder for pre-decoding, without using Viterbi decoding, received data having a first data rate;
 a first encoder for re-encoding an output from said first pre-decoder;
 a first comparator for comparing the data having the first data rate with an output from said first encoder;
 a first counter for counting the number of errors resulting from the comparison of said first comparator;
 a second pre-decoder for pre-decoding received data having a second data rate;
 a second encoder for re-encoding an output from said second pre-decoder;
 a second comparator for comparing the data having the second data rate with an output from said second encoder;
 a second counter for counting the number of errors resulting from the comparison of said second comparator; and
 a decision unit for deciding which of the data received from said first and second counters has the least symbol error rate.

12. The apparatus of claim 11, further comprising a first pre-processing unit preceding said second pre-decoder.

13. The apparatus of claim 12, wherein said first pre-processing unit is implemented with a summer, a combiner or a selector.

14. The apparatus of claim 11, further comprising:
 a third pre-decoder for pre-decoding data having a third data rate;
 a third encoder for re-encoding an output from said third pre-decoder;
 a third comparator for comparing the data having the third data rate with an output from said third encoder; and
 a third counter for counting the number of errors resulting from the comparison of said third comparator;
 wherein an output from said third counter is inputted to said decision unit.

15. The apparatus of claim 14, further comprising a first pre-processing unit preceding said second pre-decoder.

16. The apparatus of claim 15, further comprising a second preprocessing unit preceding said third pre-decoder.

17. The apparatus of claim 16, wherein said first and second preprocessing units are implemented with a summer, a combiner or a selector.

18. The apparatus of claim 14, further comprising:
 a fourth pre-decoder for pre-decoding data having a fourth data rate;
 a fourth encoder for re-encoding an output from said fourth pre-decoder;
 a fourth comparator for comparing the data having the fourth data rate with an output from the fourth encoder; and
 a fourth counter for counting the number of errors resulting from the comparison of said fourth comparator;
 wherein an output from said fourth counter is inputted to said decision unit.

19. The apparatus of claim 18, wherein said first through fourth pre-decoders use an inverse function of a generating function used for encoding.

20. The apparatus of claim 18, further comprising a first pre-processing unit preceding said second pre-decoder.

21. The apparatus of claim 20, further comprising a second preprocessing unit preceding said third pre-decoder.

22. The apparatus of claim 21, further comprising a third pre-processing unit preceding said fourth pre-decoder.

23. The apparatus of claim 22, wherein the first, second and third preprocessing units are implemented with a summer, a combiner or a selector.

24. The apparatus of claim 22, further comprising: a selector for selecting a full data rate or one of the outputs from said first, second and third pre-processing units according to an output from said decision unit; and a Viterbi decoder for Viterbi decoding only the output selected by the selector.

25. A variable-rate communications system capable of determining a data reception rate, comprising:
 a first pre-decoder which receives data at a first data rate and pre-decodes the data, without using Viterbi decoding; a first encoder which receives an output from said first pre-decoder and re-encodes the pre-decoded data;
 a first comparator which receives and compares the re-encoded data from said first encoder and the data having the first data rate;
 a first counter which receives an output from said first comparator and counts the number of errors resulting from the comparison; a second pre-decoder which receives data at a second data rate and pre-decodes the data; a second encoder which receives an output from said second pre-decoder and re-encodes the pre-decoded data;
 a second comparator which receives and compares the re-encoded data from said second encoder and the data having the second data rate;
 a second counter which receives an output from said second comparator and counts the number of errors resulting from the comparison; and
 a decision unit which receives an output from said first and second counters and decides which data rate has the least symbol error rate.

26. The apparatus of claim 25, further comprising a first pre-processing unit preceding said second pre-decoder.

27. The apparatus of claim 26, wherein said first pre-processing unit is implemented with a summer, a combiner or a selector.

28. The apparatus of claim 25, further comprising: a third pre-decoder which receives data at a third data rate and pre-decodes the data; a third encoder which receives an output from said third pre-decoder and re-encodes the pre-decoded data;
 a third comparator which receives and compares the re-encoded data from said third encoder and the data having the third data rate; and
 a third counter which receives an input from said third comparator and counts the number of errors resulting from the comparison;
 wherein an output from said third counter is inputted to said decision unit.

29. The apparatus of claim 28, further comprising a first pre-processing unit preceding said second pre-decoder.

30. The apparatus of claim 29, further comprising a second pre-processing unit preceding said third pre-decoder.

31. The apparatus of claim 30, wherein said first and second pre-processing units are implemented with a summer, a combiner or a selector.

32. The apparatus of claim 28, further comprising: a fourth pre-decoder which receives data at a fourth data rate and pre-decodes the data; a fourth encoder which receives an output from said fourth pre-decoder and re-encodes the pre-decoded data;

a fourth comparator which receives and compares the re-encoded data from said fourth encoder and the data having the fourth data rate; and a fourth counter which receives an output from said fourth comparator and counts the number of errors resulting from the comparison;

wherein an output from said fourth counter is inputted to said decision unit.

33. The apparatus of claim 32, wherein said first through fourth pre-decoders use an inverse function of a generating function used for encoding.

34. The apparatus of claim 32, further comprising a first pre-processing unit preceding said second pre-decoder.

35. The apparatus of claim 34, further comprising a second pre-processing unit preceding said third pre-decoder.

36. The apparatus of claim 35, further comprising a third pre-processing unit preceding said fourth pre-decoder.

37. The apparatus of claim 36, wherein the first, second and third pre-processing units are implemented with a summer, a combiner or a selector.

38. The apparatus of claim 36, further comprising: a selector which receives inputs from said first, second and third pre-processing units and an input having a full data rate and selects one according to an output from said decision unit; and a Viterbi decoder which receives and Viterbi decodes only said selected output from said selector.

* * * * *